April 25, 1933.   H. F. PARKER   1,904,997
BRAKE
Filed May 17, 1930

INVENTOR.
HUMPHREY F. PARKER
BY
ATTORNEY

Patented Apr. 25, 1933

1,904,997

UNITED STATES PATENT OFFICE

HUMPHREY F. PARKER, OF SOUTH BEND, INDIANA, ASSIGNOR TO BENDIX BRAKE COMPANY, OF SOUTH BEND, INDIANA, A CORPORATION OF ILLINOIS

BRAKE

Application filed May 17, 1930. Serial No. 453,382.

This invention relates to brakes and more particularly to internal expanding brakes.

An object of the invention is to provide a brake structure in which grabbing of the friction elements is eliminated.

Another object of the invention is to provide a brake structure in which an equalization of the pressure on the friction elements is attained.

A further object of the invention is to provide a brake structure in which the surface area of the friction elements is greatly increased.

A further object of the invention is to provide a brake mechanism in which distribution of pressure applied to the friction elements is more uniformly distributed.

Other objects of the invention will appear from the following description taken in connection with the drawing which forms a part of this specification, and in which.

Figure 1:
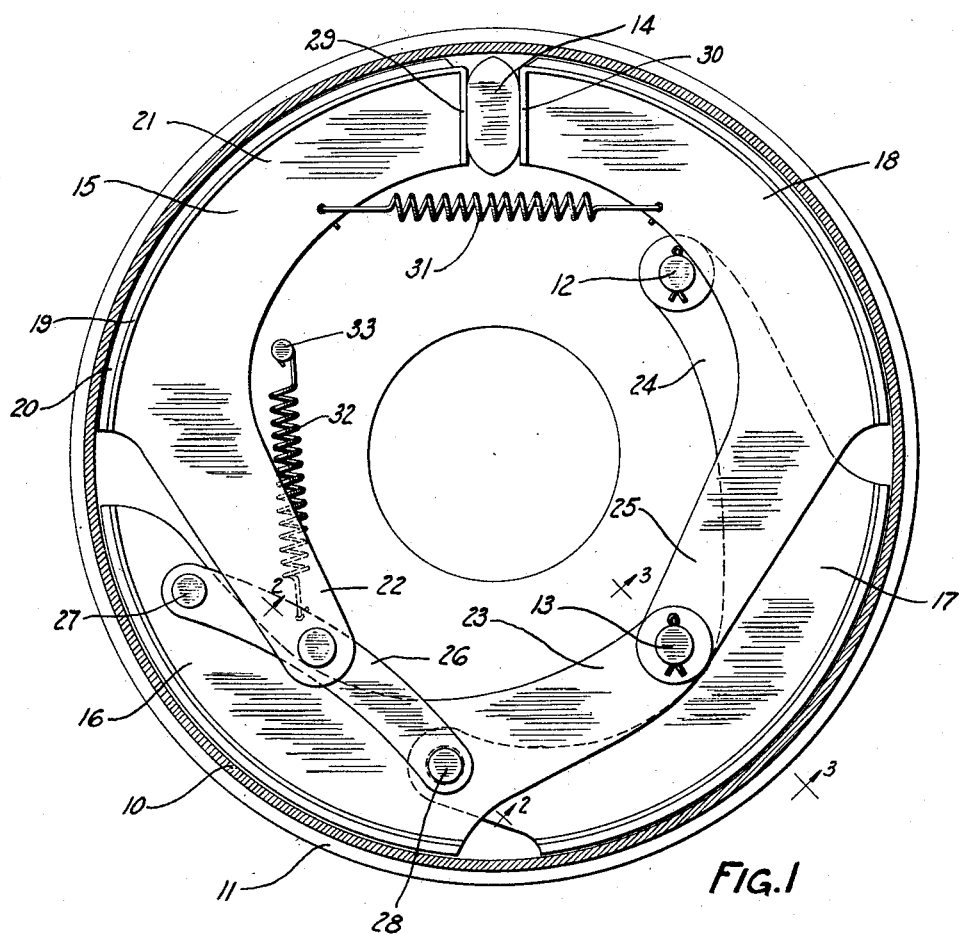
Figure 1 is a vertical sectional view taken just back of the head of the drum illustrating the friction elements in elevation.
Figures 2, 3:
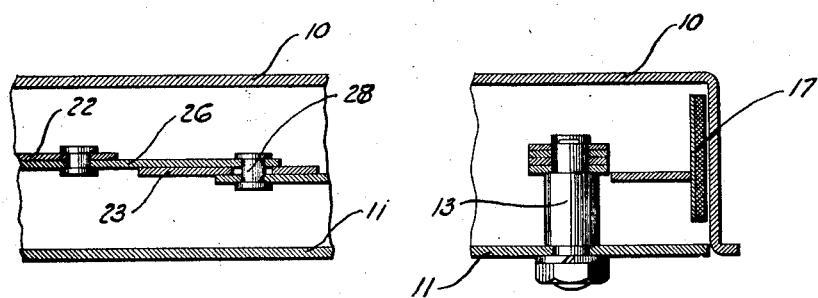
Figure 2 is a sectional view substantially on line 2—2, Figure 1.
Figure 3 is a sectional view substantially on line 3—3, Figure 1.

Referring to the drawing for more specific details of the invention, 10 represents a conventional rotatable drum at the open side of which is a stationary support such as a backing plate 11. Positioned on the backing plate are anchors 12 and 13 and an actuating cam 14.

Positioned for movement on the backing plate is a primary shoe 15, a secondary shoe 16, a second secondary shoe 17 and an auxiliary shoe 18. The primary and auxiliary shoes are interchangeable. As shown, each of the shoes comprise a rim 19 to which is secured a suitable lining 20 adaptable for engagement with the drum and a web 21 for reinforcing the rim. The primary shoe has an arm 22, the secondary shoe has an arm 23, the second secondary shoe has an arm 24 and the auxiliary shoe has an arm 25. These arms are substantially an extension of the webs 21 and each project beyond and tangentially to the rim of the shoe.

As shown, the arm 22 is pivoted to a link 26. One end of this link is pivoted, as indicated at 27, to the toe of the first secondary shoe 16, the other end of the link being pivoted, as at 28, to the toe of the second secondary shoe 17. The arm on the first secondary shoe is pivoted on the anchor 13 and the arm 24 of the second secondary shoe is pivoted on the anchor 12 and the arm 25 on the auxiliary shoe is pivoted on the anchor 13.

The primary and secondary shoes are provided respectively with shoulders 29 and 30 adaptable for engagement with the operating cam 14 and connected between the primary and secondary shoes is a coil spring 31 adapted to retain the shoes in engagement with the operating cam. A spring 32 is secured between a fixed support 33 and the link 26. The springs 31 and 32 serve as return springs and to retain the friction members in proper spaced relation to the drum when the brake is in an off position.

Upon actuation of the cam 14, the friction elements are caused to spread apart and to engage the toe of the primary shoe with the drum. This causes a slight rotation of the friction elements and a slight arcuate movement thereof. This movement transmits force through the arm 22 to the link 26 and through this link to the toes of the first and second secondary shoes. These shoes are pivoted on the anchors 12 and 13 respectively, hence they are caused to engage the drum uniformly with an equal distribution of pressure between the friction elements. By reason of this structure, a larger surface area of the friction members is provided for engagement with the radius of the drum and hence more efficient braking action may be attained.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a train of friction elements each having a heel and a toe, two of the elements being anchored at their heels and means operated by another element for applying force to the toes of the anchored elements, and another friction element effective in reverse braking and actuated simultaneously with said third element.

2. A brake comprising a series of friction elements, anchors for at least two of the elements, an actuating element and means connecting the actuating element to apply force to the toes of the anchored elements, and another friction element effective in reverse braking and actuated simultaneously with said third element.

3. A brake comprising a series of friction elements, each provided with a heel and a toe, at least two of the elements being anchored at their heels and means connected to the heel of another friction element for applying force to the toes of the anchored elements, and another friction element effective in reverse braking and actuated simultaneously with said third element.

4. A brake comprising a plurality of friction elements each having a heel and a toe, arms extending from the heels of the respective elements, the arms on at least two of the elements being anchored, a link pivotally connecting the toes of at least two of the elements and one of the elements having the arm on its heel pivotally connected to the link.

5. A brake comprising a support, a drum associated therewith, a plurality of friction elements movably positioned on the support and adaptable for co-operation with the drum, at least two of the friction elements anchored on the support, at least two of the friction elements having their free ends connected by a link and one of the elements pivotally connected to the link.

6. A brake comprising a fixed support, a rotatable drum associated therewith, a plurality of friction elements positioned for movement on the support, each of the friction elements having a heel and a toe and an arm extending from the respective heels thereof, the arms on at least two of the friction elements being anchored, a link pivotally connecting the toes of at least two of the elements and the heel of one of the elements pivotally connected substantially centrally of the links and means between two of the elements for spreading the elements in engagement with the drum.

7. A brake comprising a fixed support, a drum associated therewith, a plurality of friction elements in series on the support adaptable for cooperation with the drum, at least two of the friction elements anchored on the support at like ends with respect to the direction of drum movement, a link connecting the anchored friction elements, and a friction element pivotally connected to the link.

8. A brake comprising at least three friction elements arranged in series, anchors for the similar ends of two of the friction elements, and means for anchoring the third friction element to the anchored friction elements.

9. A brake comprising three friction elements arranged in series, anchors for the last two elements in the series and means actuated by the first element in the series for tensile application of the second element in the series and compressive application of the last element in the series.

In testimony whereof, I have hereunto signed my name.

HUMPHREY F. PARKER.